(No Model.)
7 Sheets—Sheet 2.

A. H. HEBBARD.
MACHINE FOR MAKING TARGETS.

No. 375,628. Patented Dec. 27, 1887.

Witnesses
F. L. Durand
Benj. G. Cowl

Inventor
Albert H. Hebbard,
By his Attorneys
Louis Bagger & Co.

(No Model.) 7 Sheets—Sheet 6.

A. H. HEBBARD.
MACHINE FOR MAKING TARGETS.

No. 375,628. Patented Dec. 27, 1887.

Witnesses
F. L. Orwand
Benj. T. Cowl

Inventor
Albert H. Hebbard,
By his Attorneys
Louis Bagger & Co.

(No Model.) 7 Sheets—Sheet 7.

A. H. HEBBARD.
MACHINE FOR MAKING TARGETS.

No. 375,628. Patented Dec. 27, 1887.

Witnesses
F. L. Ourand
Benj. G. Cowl

Inventor
Albert H. Hebbard
By his Attorneys
Louis Bagger & Co.

UNITED STATES PATENT OFFICE.

ALBERT H. HEBBARD, OF CLEVELAND, OHIO.

MACHINE FOR MAKING TARGETS.

SPECIFICATION forming part of Letters Patent No. 375,628, dated December 27, 1887.

Application filed April 8, 1887. Serial No. 234,208. (No model.)

*To all whom it may concern:*

Be it known that I, ALBERT H. HEBBARD, a citizen of the United States, and a resident of Cleveland, in the county of Cuyahoga and State of Ohio, have invented certain new and useful Improvements in Machines for Making Targets; and I do hereby declare that the following is a full, clear, and exact description of the invention, which will enable others skilled in the art to which it appertains to make and use the same, reference being had to the accompanying drawings, which form a part of this specification, and in which—

Figure 1:
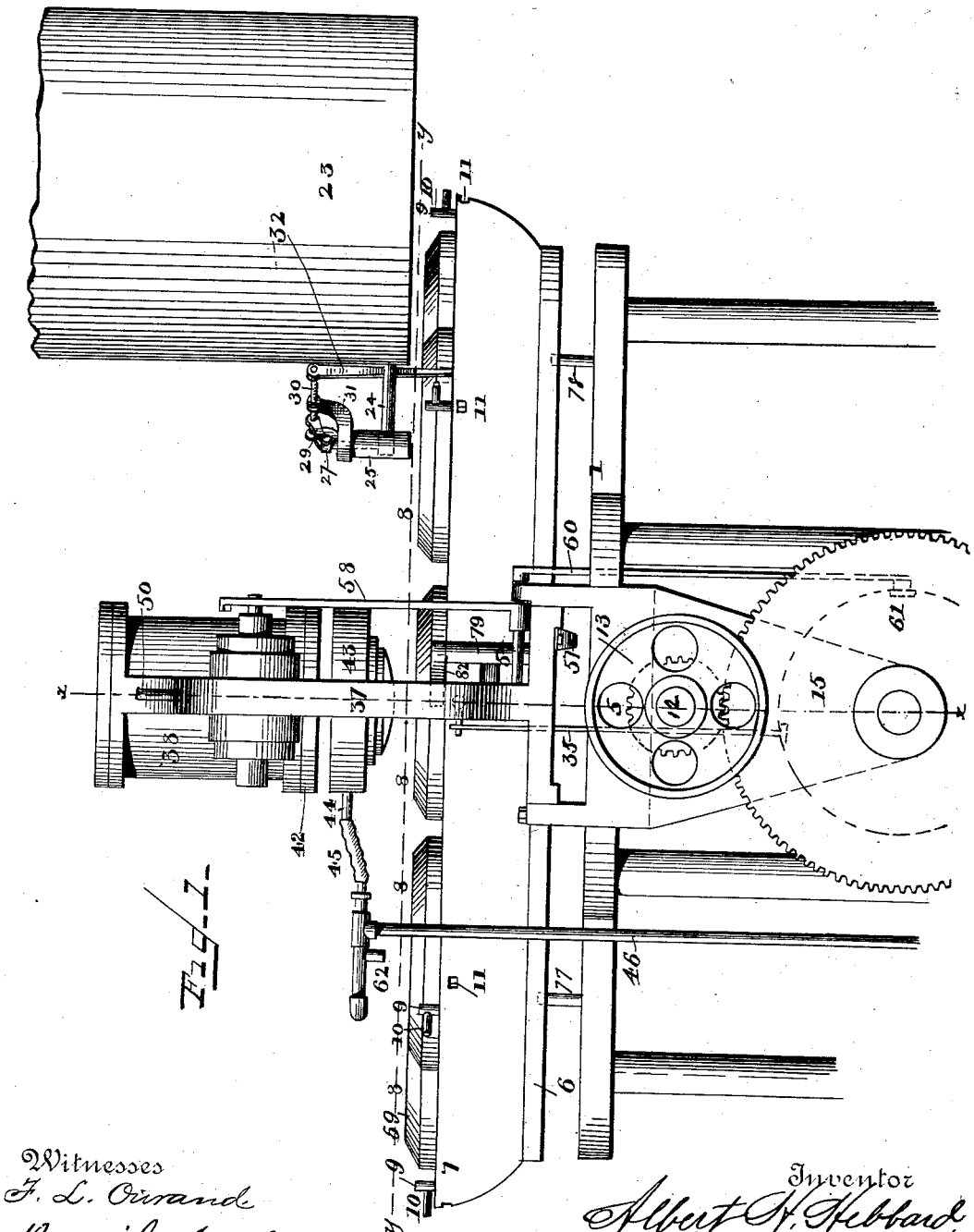
Figure 2:
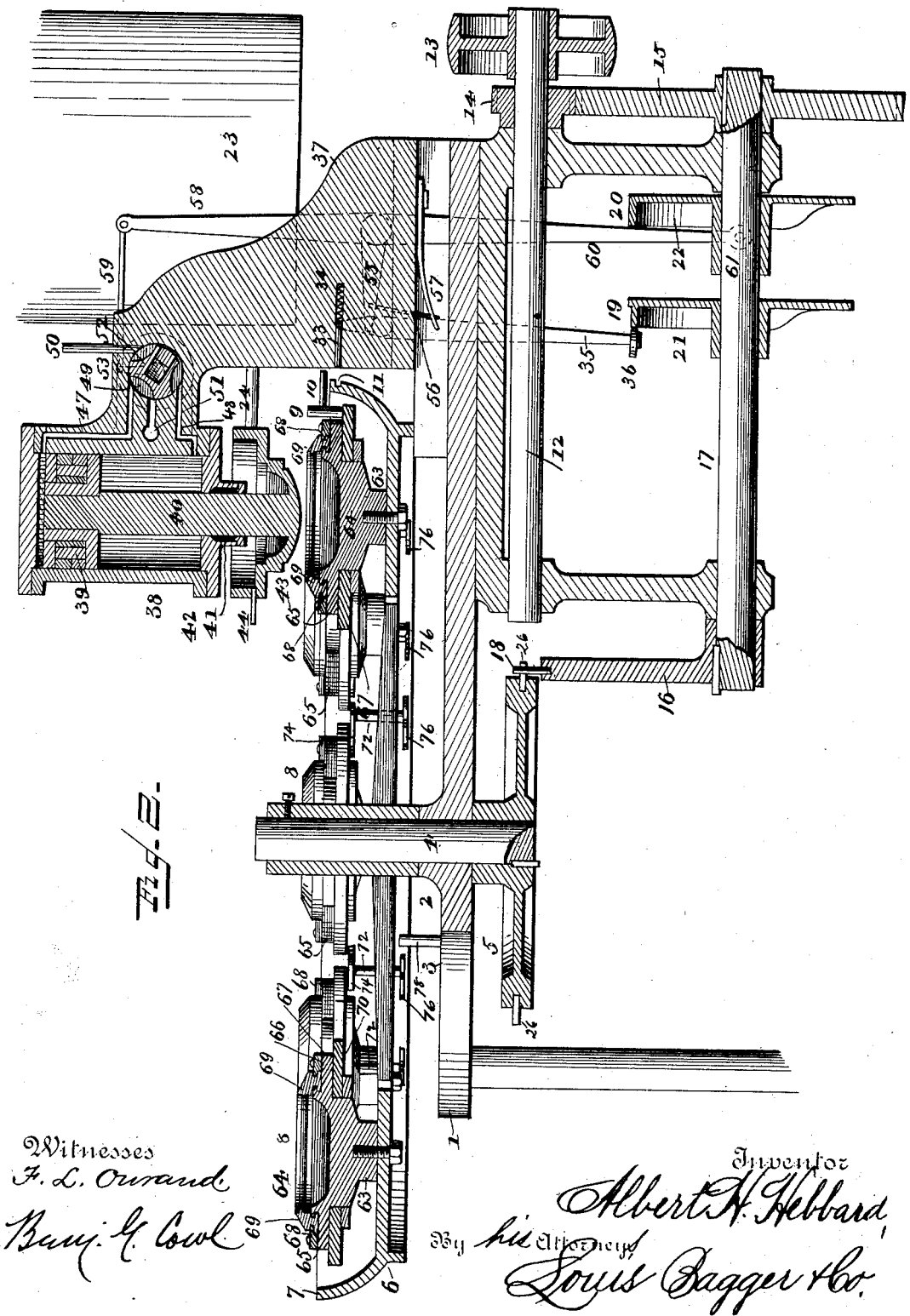
Figure 3:
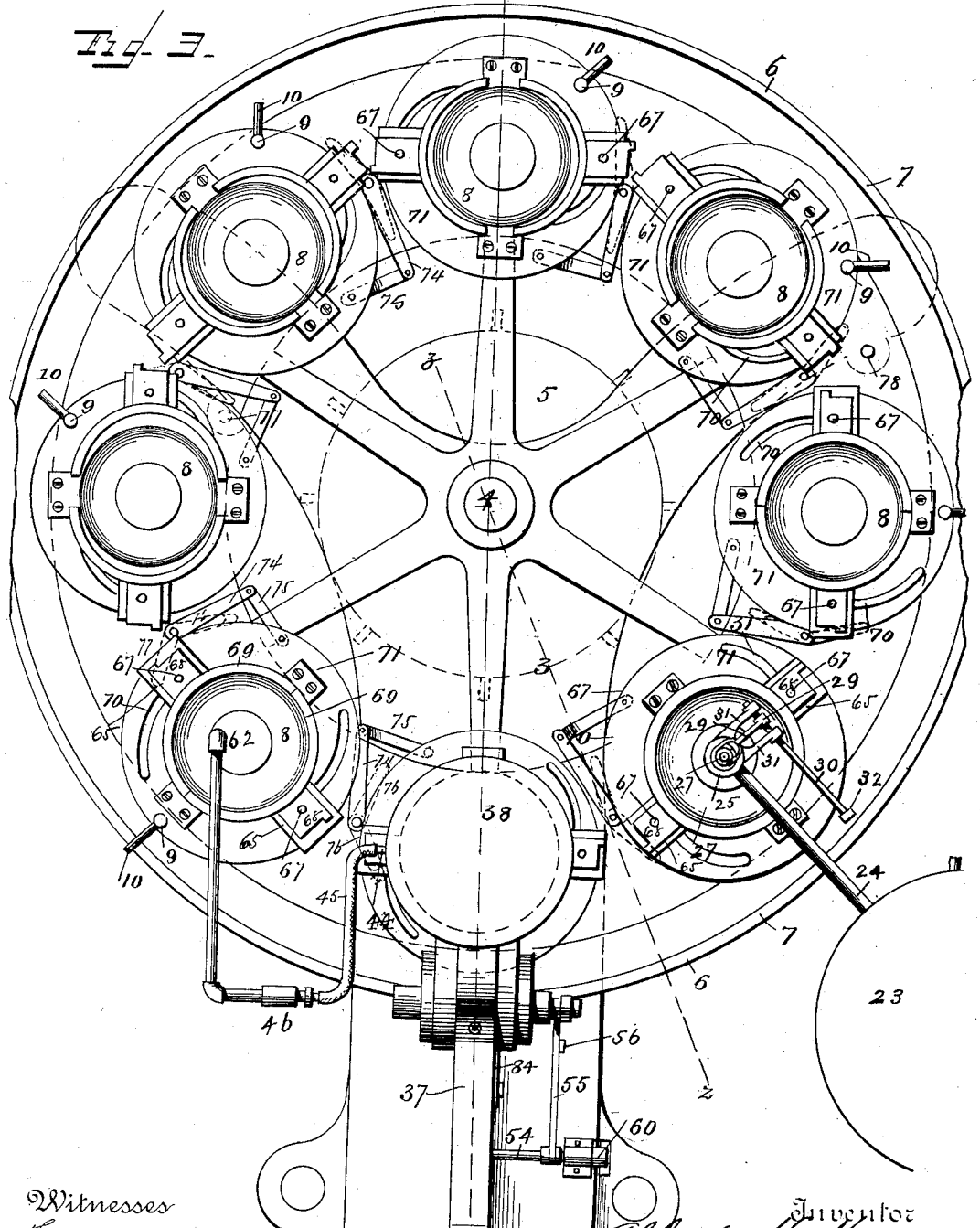
Figure 4:
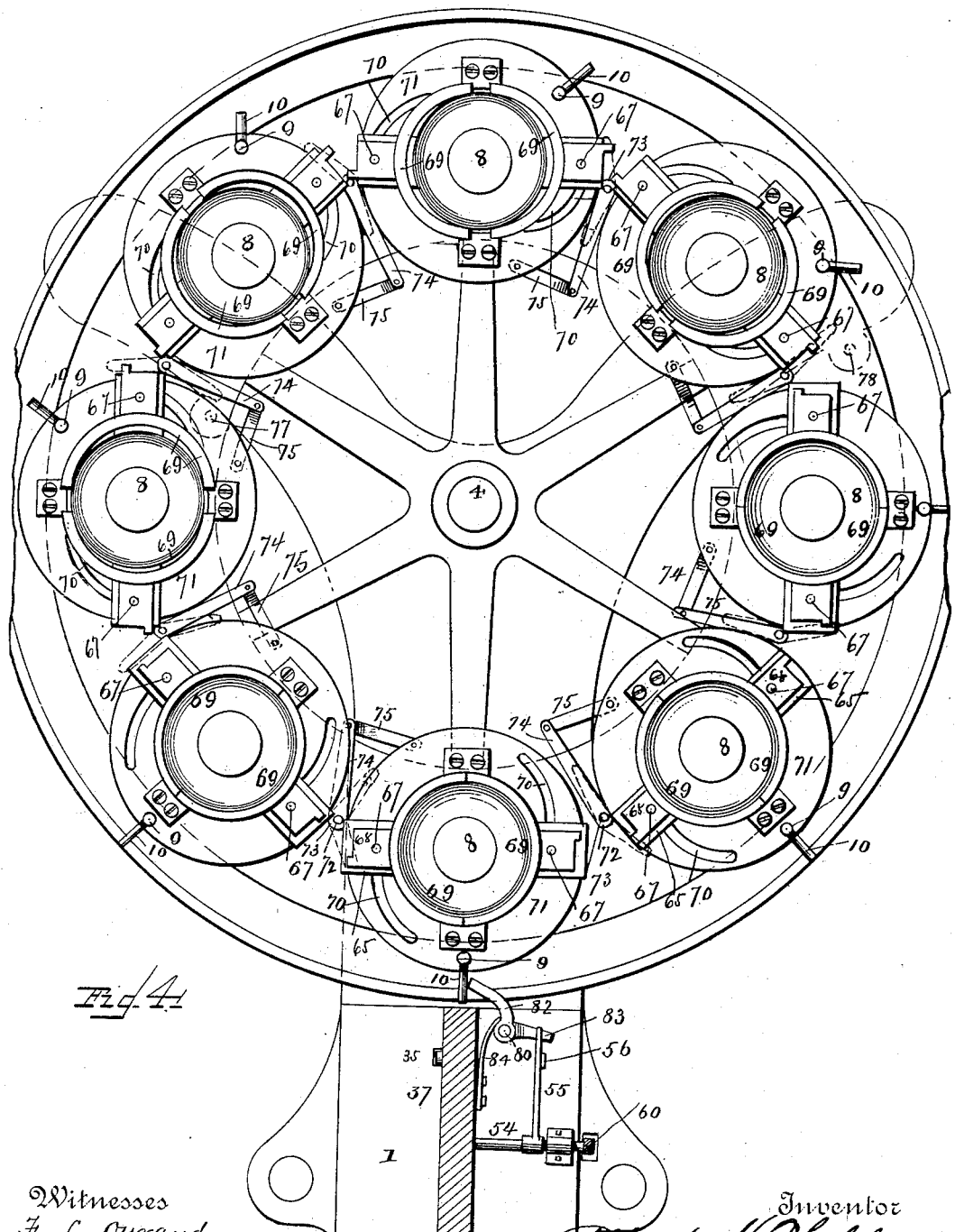
Figure 5:
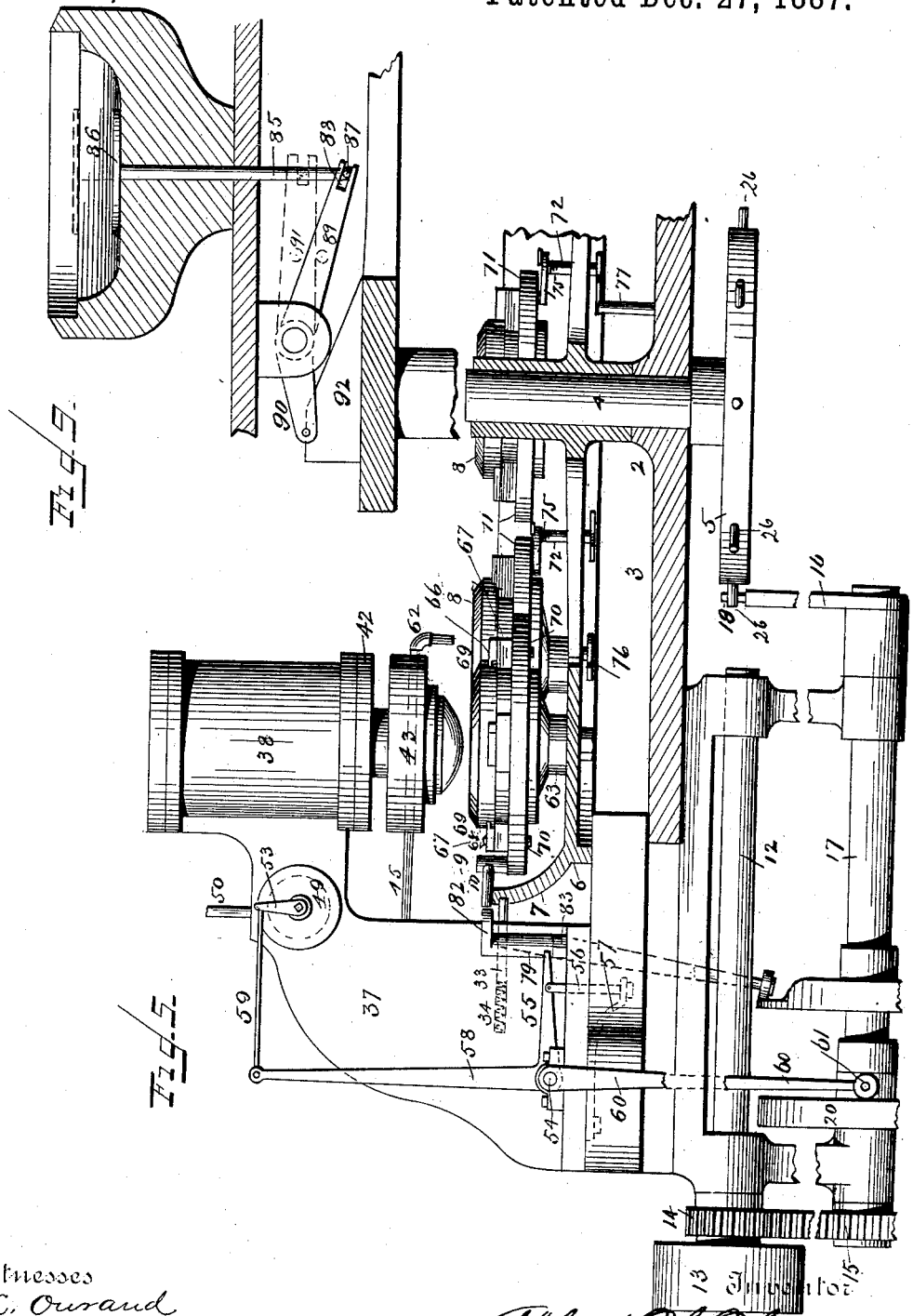
Figure 6:
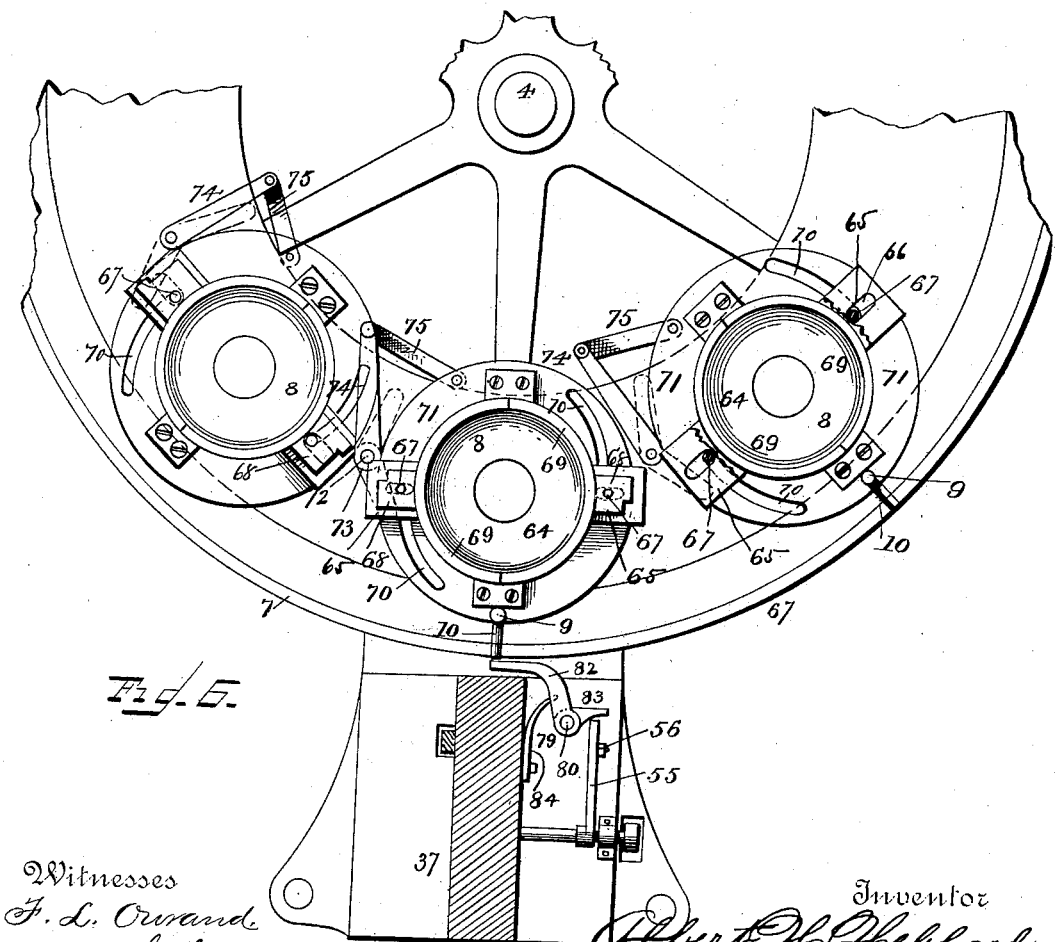
Figure 8:
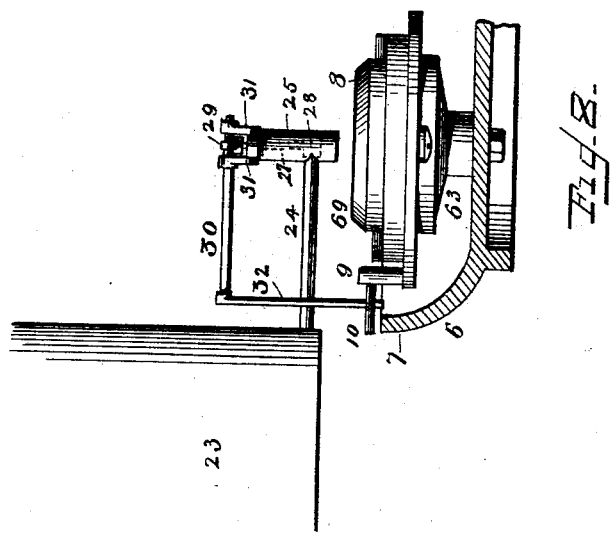
Figure 7:
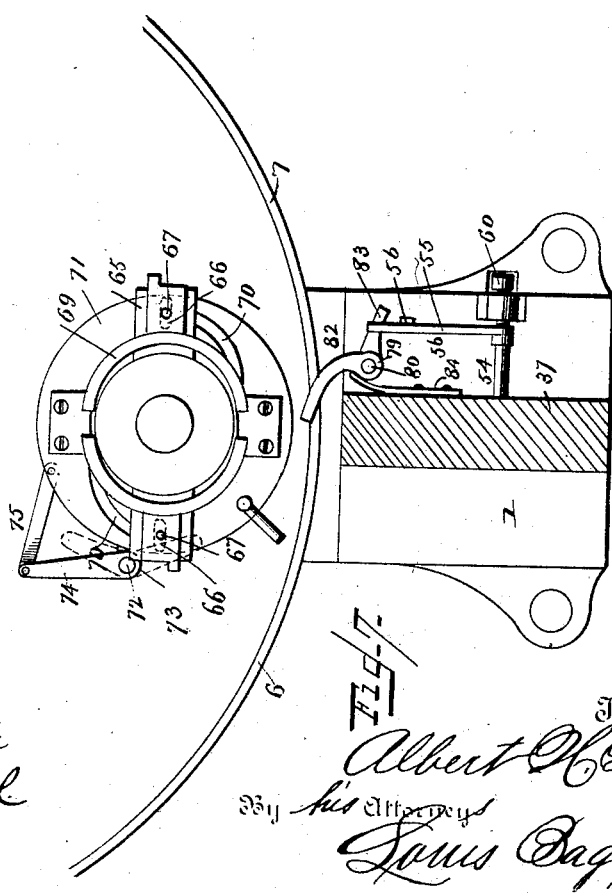

Figure 1 is a front view of my improved machine for making flying targets. Fig. 2 is a vertical sectional view on line $xx$, Fig. 1. Fig. 3 is a top plan view of the machine. Fig. 4 is a horizontal sectional view on line $yy$, Fig. 1. Fig. 5 is a vertical sectional view on line $zz$, Fig. 3. Fig. 6 is a detail plan view showing the operation of the device for preventing the plunger from descending upon an obstructed mold. Fig. 7 is a similar view showing the device for opening the mold. Fig. 8 is a detail side view of the cock for the filling-pipe and a mold operating the cock, and Fig. 9 is a sectional detail view of a modified form of mold.

Similar numerals of reference indicate corresponding parts in all the figures.

My invention has relation to machines for making flying targets; and it consists in the improved method of and machine for manufacturing the dish-shaped targets out of a brittle composition, the so-called "blackbird targets," as hereinafter more fully described and claimed.

In the accompanying drawings, the numeral 1 indicates a stand or support having a central vertical bearing, 2, in its horizontal top 3, and a shaft, 4, is journaled in this bearing and provided with a spur-wheel, 5, upon its lower end below the top of the stand, and with a turn-table, 6, secured above the top of the stand and provided with an upwardly-turned flange or rim, 7.

A number of molds, 8, are secured upon this turn-table, arranged in an annular series, and have each a stud, 9, projecting upward from their base-plates, provided with a radiating arm, 10, at the upper end, which arm normally projects out over the flange of the turn-table, the said turn-table having notches 11 in the outer side of the flange registering with the studs and their arms. A horizontal shaft, 12, is journaled in the support radially arranged to the turn-table, and the outer end of this shaft is provided with a suitable belt-pulley, 13, or similar gear, by means of which the shaft may be revolved, and with a pinion, 14, meshing with a cog-wheel, 15, secured upon a horizontal shaft, 17, below the same, the said shaft having a radiating arm, 16, upon its inner end, provided with a spur, 18, at its end, with which it may engage one of the spurs, 26, upon the wheel 5 upon the vertical shaft, moving it the space of one spur for each revolution of the cog-wheel and arm, there being as many spurs upon the wheel as there are molds upon the turn-table.

Two cam-disks, 19 and 20, are secured upon the shaft having the cog-wheel, and have, respectively, segmental flanges 21 and 22 projecting from their faces at the peripheries, the function of which disks and flanges will be more fully described hereinafter.

A tank, 23, containing the composition, which is kept in a fluid state and under suitable pressure, is supported at the side of the turn-table, and is provided with a discharge-pipe, 24, at its lower end projecting over the edge of the turn-table, having a stop-cock registering with the centers of the molds upon the same. This stop-cock consists of a vertical tube or nozzle, 25, open at its lower end, and having the discharge-pipe entering its side, and a plunger, 28, slides in the tube and is secured to a rod, 27, the upper end of which is pivotally connected to an arm, 29, projecting from a shaft, 30, journaled in suitable brackets, 31, upon the top of the tube. A downwardly-projecting arm, 32, is secured to the end of this shaft, and may have its lower end engaged by the arm projecting from the stud upon each mold. It will now be seen that when the turn-table is revolved the arm upon the mold will strike the downwardly-projecting arm of the cock, tilting the same and lifting the plunger in the tube, the said plunger normally covering the opening of the discharge-pipe in the tube, and as the arm of the mold is radiating from the same the cock or nozzle will be opened and the composition filled into the mold when the center of the latter is under the nozzle. As the turn-table is revolved from under the nozzle, the arm of the mold will slip under the downwardly-projecting operating-arm and allow the latter to fall back in its vertical position by its own gravity, closing the cock or nozzle. A spring-latch, 33, slides horizontally in the supporting-frame and engages the notches in the flange of the turn-table, having a spring, 34, forcing it outward toward the said flange, and the bearing of this latch or bolt is a distance from the discharge-pipe and nozzle of the tank corresponding to the distance between the centers of two molds, so that the latch will engage one notch when the adjoining mold is under the discharge-nozzle.

The upper end of the vertically-rocking lever 35 is pivoted to this bolt or latch, and the lever is fulcrumed near the said upper end, and the longer lower arm of the lever is provided at its end with a revolving roller, 36, with which it bears against the face of the cam-disk 19, nearest to the inner end of the shaft having the cog-wheel, being engaged by the cam-flange, so that the lower end of the lever may be tilted inward by the said flange, tilting the upper end and the spring-bolt outward from the turn-table, disengaging the latch from the notch in the same and allowing it to be turned. The supporting-frame is provided with an upwardly-projecting bracket, 37, having its upper end overhanging the turn-table, and a cylinder, 38, is secured to the upper overhanging end of this bracket, and has a piston, 39, reciprocating within it, having its rod 40 sliding in a stuffing-box, 41, in its closed lower head, 42. The lower end of this piston-rod is provided with a hollow plunger, 43, corresponding in shape and size to the mold, forming the relief-mold to the intaglio of the lower mold upon the turn-table, and this plunger is provided with a nipple, 44, to which is attached a flexible tube, 45, extending from a cold-water pipe, 46.

The cylinder is provided with channels 47 and 48, extending from the ends into a valve-chest, 49, which is provided with an inlet-port, 50, and exhaust-port 51, and with a rocking valve, 52, of suitable construction, the said valve having an arm, 53, upon its rocking shaft, and having the inlet-port and the upper channel connected when the arm is tilted toward the turn-table, forcing the plunger down, while the arm being tilted from the turn-table will connect the inlet and the lower channel, exhausting from the upper channel, and thus raising the plunger.

A shaft, 54, is journaled upon the support at the base of the bracket and has an inwardly-projecting arm, 55, to which a rod, 56, is secured near the free end, having its lower end secured in a spring, 57, secured upon the under side of the support and drawing the said rod down; and the shaft is furthermore provided with an upwardly-projecting arm, 58, to the end of which is pivoted a rod, 59, pivoted to the valve-operating arm, and a downwardly-projecting arm, 60, having a roller, 61, pivoted upon its lower end and bearing against the face of the outer disk upon the shaft of the cog-wheel, engaging the segmental flange upon the same and traveling upon it.

It will be seen that the spring drawing the inwardly-projecting arm downward will force the lower arm of the shaft to bear with its roller against the flange of the cam-disk, and when the roller arrives at the end of the flange the arm will be tilted toward the face of the disk, tilting the upper arm and the valve-operating arm toward the turn-table, opening the connection between the upper channel of the cylinder and the inlet-port, admitting the operating medium into the upper end of the cylinder and forcing the plunger down, and as the cam-disk now revolves it will again tilt the arms of the shaft, closing the inlet and opening for the exhaust in the upper end of the cylinder, forcing the plunger upward.

The plunger is forced downward when the spring-latch has engaged its notch, and the spring-latch will be disengaged at the same time the plunger is raised and the turn-table is turned, so that one mold will be filled and one mold have its target pressed into shape at the same time, whereupon the turn-table will be turned and the last-filled mold will be pressed while another mold is filled.

The mold which has just been pressed will be brought under a stream of water passing out of a nozzle, 62, at the end of the cold-water pipe, the said nozzle registering with the center of the mold, so that while one mold is filled and the other mold is pressed the third mold will be cooled off, so that the finished target may be removed.

The molds consist, preferably, of a central stem, 63, which is secured to the bottom of the turn-table, and the upper end of which is provided with a cup-shaped head, 64, forming the bottom of the mold. This head is formed with two diametrically-opposite projecting arms, 65, having longitudinal slots 66, and downwardly-projecting bolts 67 slide in these slots and project from two diametrically-oppositely-projecting arms, 68, extending from the two rim-halves 69, which form the sides of the mold, the said arms sliding upon the slotted arms with the bolts and having the lower ends of the bolts projecting through and sliding in oblique curved slots 70 in a flat ring, 71, turning upon the stem under the slotted arms of its head. It will be seen that as the slots in this ring are oblique the bolts sliding in the slotted arms will be forced outward when the ring is turned in one direction, and inward when the ring is turned in the opposite direction, and the sides of the mold sliding with the bolts, the mold may be opened or closed by turning the ring.

A vertical shaft, 72, is journaled in a suitable bearing, 73, at the end of one of the slotted arms, and the upper end of this shaft is provided with an arm, 74, projecting to one side and having an arm, 75, pivoted to its end and to the turning ring, and the lower end of the shaft has two arms, 76, projecting from it at an obtuse angle to each other, by means of which arms the shaft may be rocked and the ring turned, opening or closing the mold.

It will be seen, by reference to the drawings, that when the inwardly projecting one of these two arms is struck and tilted toward the mold the ring will be turned, opening the mold, and when the outwardly-projecting arm is tilted the ring will be turned back and the mold closed, and two upwardly - projecting pins, 77 and 78, are therefore secured upon the table of the support at a distance of two mold-spaces from the plunger to both sides of the same, so that the mold may be opened after the target has been cooled by the jet of water, and may again be closed before arriving under the nozzle of the tank, the targets being removed from the molds after they have been opened.

A small lever, 79, is fulcrumed upon an upright pin, 80, upon the support at the foot of the cylinder-supporting bracket, and this lever consists of a sleeve, 81, turning upon the bolt or pin, and of a curved arm, 82, at the upper end of the sleeve, projecting with its curved outer end toward the flange of the turn-table, and of an arm, 83, at the lower end of the sleeve, projecting in the opposite direction under the inwardly-projecting and spring-actuated arm, 55, of the rock-shaft upon the support. A spring, 84, serves to hold the curved arm toward the direction of the flange of the turn-table and the other arm under the spring-actuated arm.

When the mold is perfectly closed, the arm of the stud upon the ring of the mold will project radially and will bear against the curved arm 82 of the small stop-lever, tilting the same inward, and thus allowing the spring-actuated arm and the valve-operating arms to be tilted, causing the plunger to descend; but if the mold should be in any way obstructed, so that it cannot be closed, the arm of the stud will not project sufficiently out to tilt the lever, which will thus bear with its arm under the spring-actuated arm, preventing the same from being tilted, and consequently preventing the plunger from descending, so that no accident may happen to the mold or plunger or to the other mechanism by the plunger descending into an obstructed mold.

The herein-described mold is preferably used for targets having grooved or ribbed flange; but for targets having a plain smooth flange another mold may be used, which is shown in Fig. 9. This mold is made solid in one piece and has a vertically-sliding rod, 85, in its stem, which is provided at its upper end with a disk, 86, forming the depressed portion in the top of the target. The lower end of this rod has a transverse pin, 87, the ends of which slide in the slotted and bifurcated ends 88 of a lever, 89, fulcrumed upon the under side of the turn-table and bent at an obtuse angle, having its bend at the fulcrum. The free arm of this lever is provided with a stud, 90, projecting outward, and the inner arm of the lever is provided with a laterally-projecting pin, 91, and these pins may be engaged by wedge-shaped ribs 92, upon the top of the support, the stud of the free arm being engaged and lifted for the purpose of drawing the rod and disk 86 down, while the stud of the inner arm is engaged to raise the rod and disk, raising the finished target out of the mold ready for removal. It follows that various modifications may be made in the construction of the details of this machine, as such modifications or changes may be found expedient for the character of the targets manufactured and the character of the composition used in their manufacture, and all well-known equivalents of mechanical parts of the machine may be employed without departing from the spirit of my invention.

Having thus described my invention, I claim and desire to secure by Letters Patent of the United States—

1. A machine for manufacturing dish-shaped flying targets, comprising a tank or reservoir having a suitable nozzle and receiving the melted composition, a reciprocating plunger at the side of the tank, a water-nozzle at the side of the plunger, and a traveling series of molds traveling consecutively and stopping under the nozzle of the tank, the plunger, and the water-nozzle, as and for the purpose shown and set forth.

2. In a machine for manfacturing flying targets of dish shape, the combination of a reservoir or tank for the melted composition, having a suitable nozzle and cock provided with a downwardly-projecting operating-arm, a reciprocating plunger at the side of the tank having a curved arm for controlling the reciprocating mechanism, and a turn-table having means for revolving it, and having an annular series of molds provided each with a radially-projecting arm at their outer edges, engaging successively the arm of the filling-nozzle, and the arm releasing the reciprocating mechanism, as and for the purpose shown and set forth.

3. In a machine for manufacturing dish-shaped flying targets, the combination of a tank having a discharge-pipe provided at its ends with a vertical tube having a plunger reciprocating within it, a shaft journaled transversely at the upper end of the tube or nozzle, and having a short arm between the bearings pivotally connected to the plunger, and a long downwardly-projecting gravitating arm, and a revolving turn-table having an annular series of molds provided each with an outwardly-projecting stud engaging the arm of the filling-nozzle, and tilting it when the nozzle registers with the center of the mold, as and for the purpose shown and set forth.

4. In a machine for manufacturing dish-shaped flying targets, the combination of a horizontally - revolving turn-table having a central shaft, and provided with an annular series of molds near its edge, a filling-tank having a nozzle, and a reciprocating plunger registering with pairs of the molds, a spur-wheel upon the shaft of the turn-table, and a revolving shaft having an arm at its end engaging the spurs with its reduced end, as and for the purpose shown and set forth.

5. In a machine for manufacturing dish-shaped flying targets, the combination of a horizontally-revolving turn-table having an annular series of molds near its edge, and having a registering series of notches in its edge, a filling-tank having a nozzle and a reciprocating plunger registering with pairs of the molds, a spring-latch engaging the notches in the turn-table, a vertically-rocking lever having its upper end pivoted to the latch, and having its lower end provided with a roller, and a drive-shaft revolving the turn table, and having a cam-disk upon it provided with a flange projecting from the face at the periphery, extending a portion of the periphery, and having the lower end of the lever bearing against it, as and for the purpose shown and set forth.

6. In a machine for manufacturing dish-shaped flying targets, the combination of a horizontally-journaled turn-table having an annular series of molds, and having a spur-wheel at its central shaft, with a revolving shaft having a radiating arm provided with a reduced end adapted to engage the spurs upon the wheel of the turn-table, as and for the purpose shown and set forth.

7. In a machine for manufacturing dish-shaped flying targets, the combination of a revolving turn-table having an annular series of molds, a cylinder having a rocking distributing-valve and distributing-channels for distributing compressed air to and from both ends of the cylinder, a plunger registering with the molds and secured to the rod of a piston within the cylinder, a drive-shaft revolving the turn-table, and having a cam-disk provided with a segmental flange upon its face at the periphery, and a lever having its lower arm bearing with its end against the flange of the cam-disk, and having its upper end suitably connnected to the distributing-valve operating the same, as and for the purpose shown and set forth.

8. In a machine for manufacturing dish-shaped flying targets, the combination of a turn-table having an annular series of molds provided with outwardly-projecting arms, and having means for revolving it the space of a mold at a time, a cylinder registering with the molds, and having a distributing-valve rocking in a casing or chest and distributing-channels extending to the ends of the cylinder conveying and exhausting compressed air or a similar medium to and from the ends of the cylinder, a plunger fitting in the molds and secured to the lower end of a piston-rod in the cylinder, an upright sleeve journaled upon a shaft near the periphery of the turn-table, and having a curved arm at its upper end engaged by the studs upon the molds of the turn-table, and an arm projecting in the opposite direction from its lower end and provided with a spring forcing the curved arm toward the turn-table, a revolving cam-disk having a segmental flange upon its face near or at the periphery, and a shaft having a downwardly-projecting arm engaging the flanged disk with its end, and a forwardly-projecting arm having a spring for drawing it down and engaging the lower arm of the sleeve and provided with an upwardly-projecting arm rocking the valve, as and for the purpose shown and set forth.

9. In a machine for manufacturing dish-shaped flying targets, the combination of a turn-table revolving the space of one mold at a time, an annular series of molds upon the turn-table having sliding side pieces and having partly-revolving rings opening and closing the said sides and provided with arms projecting outward when the molds are closed, a cylinder registering with the molds and having a plunger reciprocating into the molds, a vertically-journaled sleeve having a curved arm at its upper end engaging the outwardly-projecting arms of the closed molds, and having an arm projecting at the lower end in the opposite direction, and a spring forcing the curved arm toward the turn-table, a cam-disk having a segmental flange upon its face, and a shaft having an arm engaging the said flange with its end and having an arm resting normally upon the arm at the lower end of the sleeve having a spring drawing it down and provided with an arm operating the reciprocating plunger when tilted forward, as and for the purpose shown and set forth.

10. In a machine for manufacturing dish-shaped flying targets, the combination of a stand having a vertical top, a turn-table revolving with a vertical shaft upon the stand, molds arranged in an annular series upon the turn-table, and consisting of a stem having a cup-shaped head provided with longitudinally-slotted arms at opposite sides having downwardly-projecting studs, arms projecting from two side pieces sliding within them, annular rings or plates revolving upon the molds and having oblique curved slots engaged by the lower ends of the studs, a vertically-journaled shaft upon the side of each mold provided with arms at the lower end projecting at an obtuse angle and with an arm at the upper end provided with a pivoted connecting-arm pivoted to the revolving ring upon the mold, and studs upon the support engaging alternately the opposite arms at the lower ends of the shafts of the molds opening or closing them, as and for the purpose shown and set forth.

In testimony that I claim the foregoing as my own I have hereunto affixed my signature in presence of two witnesses.

ALBERT H. HEBBARD.

Witnesses:
L. H. WARE,
CHAS. C. HEBBARD.